United States Patent
Garcia et al.

(10) Patent No.: US 7,433,024 B2
(45) Date of Patent: Oct. 7, 2008

(54) RANGE MAPPING USING SPECKLE DECORRELATION

(75) Inventors: Javier Garcia, Valencia (ES); Zeev Zalevsky, Ha'ayin (IL)

(73) Assignee: Prime Sense Ltd., Tel Aviv (IL)

( * ) Notice: Subject to any disclaimer, the term of this patent is extended or adjusted under 35 U.S.C. 154(b) by 80 days.

(21) Appl. No.: 11/712,932

(22) Filed: Feb. 27, 2007

(65) Prior Publication Data

US 2007/0216894 A1   Sep. 20, 2007

Related U.S. Application Data

(60) Provisional application No. 60/776,655, filed on Feb. 27, 2006.

(51) Int. Cl.
 G01C 3/08 (2006.01)
 G01B 11/24 (2006.01)
 G01B 11/30 (2006.01)

(52) U.S. Cl. ...................... 356/4.01; 356/610

(58) Field of Classification Search ............. 356/4.01, 356/4.03, 4.09, 610, 612
See application file for complete search history.

(56) References Cited

U.S. PATENT DOCUMENTS

| | | | |
|---|---|---|---|
| 4,802,759 A | | 2/1989 | Matsumoto et al. |
| 4,843,568 A | | 6/1989 | Krueger et al. |
| 5,020,904 A | * | 6/1991 | McMahan, Jr. ............ 356/35.5 |
| 5,075,562 A | | 12/1991 | Greivenkamp, Jr. |
| 5,212,667 A | * | 5/1993 | Tomlinson et al. ............ 367/7 |
| 5,838,428 A | | 11/1998 | Pipitone et al. |
| 6,101,269 A | * | 8/2000 | Hunter et al. ............... 382/154 |
| 6,128,082 A | * | 10/2000 | Cloud ....................... 356/503 |
| 6,167,151 A | | 12/2000 | Albeck et al. |
| 6,262,740 B1 | | 7/2001 | Lauer et al. |
| 6,438,263 B2 | | 8/2002 | Albeck et al. |
| 6,686,921 B1 | | 2/2004 | Rushmeier et al. |
| 6,741,251 B2 | | 5/2004 | Malzbender |
| 6,751,344 B1 | | 6/2004 | Grumbine |
| 6,754,370 B1 | | 6/2004 | Hall-Holt et al. |

(Continued)

FOREIGN PATENT DOCUMENTS

DE   19638727   3/1998

(Continued)

OTHER PUBLICATIONS

U.S. Appl. No. 60/785,187.

(Continued)

*Primary Examiner*—Patrick J Connolly
(74) *Attorney, Agent, or Firm*—Abelman, Frayne & Schwab

(57) ABSTRACT

A method for mapping includes projecting a primary speckle pattern from an illumination assembly into a target region. A plurality of reference images of the primary speckle pattern are captured at different, respective distances from the illumination assembly in the target region. A test image of the primary speckle pattern that is projected onto a surface of an object in the target region is captured and compared to the reference images so as to identify a reference image in which the primary speckle pattern most closely matches the primary speckle pattern in the test image. The location of the object is estimated based on a distance of the identified reference image from the illumination assembly.

14 Claims, 3 Drawing Sheets

U.S. PATENT DOCUMENTS

| | | | |
|---|---|---|---|
| 7,292,232 B2 * | 11/2007 | Ranta et al. | 345/175 |
| 2001/0016063 A1 * | 8/2001 | Albeck et al. | 382/154 |
| 2002/0075456 A1 | 6/2002 | Shiratani | |
| 2003/0057972 A1 | 3/2003 | Pfaff et al. | |
| 2004/0130730 A1 | 7/2004 | Cantin et al. | |
| 2004/0174770 A1 | 9/2004 | Rees | |
| 2005/0146708 A1 * | 7/2005 | Shi et al. | 356/35.5 |
| 2005/0243055 A1 * | 11/2005 | Ranta et al. | 345/156 |
| 2008/0106746 A1 * | 5/2008 | Shpunt et al. | 356/610 |

FOREIGN PATENT DOCUMENTS

| | | |
|---|---|---|
| DE | 19736169 | 4/1999 |
| GB | 2352901 | 2/2001 |
| JP | 62206684 | 9/1987 |
| TW | 527528 | 4/2003 |
| WO | WO 93/03579 | 2/1993 |
| WO | WO 2007/043036 | 2/2007 |

OTHER PUBLICATIONS

U.S. Appl. No. 60/852,436.
U.S. Appl. No. 60/724,903.
U.S. Appl. No. 60/776,655.
Ben Eliezer, et al., "All optical extended depth of field imaging system", Journal of Optics A: Pure and Applied Optics—A, 5 (2003), pp. S164-S169.
U.S. Appl. No. 09/616,606.
International Patent Application No. PCT/IL2007/000306.
Yung-Sheng Chen, et al., "Measuring of a Three-Dimensional Surface by Use of a Spatial Distance Computation", Applied Optics, vol. 42, Issue 11, pp. 1958-1972, 2003 (an abstract).
I.A. Ypsilos, Centre for Vision, Speech and Signal Processing, School of Electronics and Physical Sciences, University of Surrey, UK, 2004 (an abstract).
S.G. Hanson, et al., "Optics and Fluid Dynamics Department", Annual Progress Report for 1997 (an abstract).
Didi Sazbon, et al., "Qualitative real-time range extraction for preplanned scene partitioning using laser beam coding", Pattern Recognition Letters 26 (2005) 1772-1781.
M. Sjodahl, et al., "Measurement of shape by using projected random and patterns and temporal digital speckle photography", Applied Optics, vol. 38, No. 10, Apr. 1999.
Javier Garcia, et al., "Three-dimensional mapping and range measurement by means of projected speckle patterns", applied Optics, vol. 45, No. 23, Aug. 2006.
U.S. Appl. No. 60/909,487.

* cited by examiner

RANGE MAPPING USING SPECKLE DECORRELATION

CROSS-REFERENCE TO RELATED APPLICATIONS

This application claims the benefit of U.S. Provisional Patent Application 60/776,655, filed Feb. 27, 2006, whose disclosure is incorporated herein by reference.

FIELD OF THE INVENTION

The present invention relates generally to methods and systems for mapping of three-dimensional (3D) objects, and specifically to optical ranging using speckle patterns.

BACKGROUND OF THE INVENTION

When a coherent beam of light passes through a diffuser and is projected onto a surface, a primary speckle pattern can be observed on the surface. The primary speckle is caused by interference among different components of the diffused beam. The term "primary speckle" is used in this sense in the present patent application and in the claims, in distinction to secondary speckle, which is caused by diffuse reflection of coherent light from the rough surface of an object Hart describes the use of a speckle pattern in a high-speed 3D imaging system, in Taiwanese Patent TW 527528 B and in U.S. patent application Ser. No. 09/616,606, whose disclosures are incorporated herein by reference. A speckle pattern is projected onto an object, and images of the resulting pattern are acquired from multiple angles. The images are locally cross-correlated using an image correlation technique, and the surface is resolved by using relative camera position information to calculate the three-dimensional coordinates of each locally-correlated region.

Another speckle-based 3D imaging technique is described by Hunter et al., in U.S. Pat. No. 6,101,269, whose disclosure is incorporated herein by reference. A random speckle pattern is projected upon a 3D surface and is imaged by a plurality of cameras to obtain a plurality of two-dimensional digital images. The two-dimensional images are processed to obtain a three-dimensional characterization of the surface.

SUMMARY OF THE INVENTION

Methods of speckle-based 3D mapping that are known in the art generally rely on computation of the cross-correlation between an image of a speckle pattern that is projected onto an object and an image of the same speckle pattern on a reference surface. The locations of local cross-correlation peaks indicate the displacement of points on the object surface relative to the reference surface. These methods thus require that the speckle pattern be relatively invariant over a range of distances from the illumination source, and they are capable of effective 3D mapping only within this range, in which sufficiently strong cross-correlation peaks can be found.

Embodiments of the present invention, on the other hand, use the decorrelation of the speckle pattern with distance from the source to perform distance ranging. Reference images of the speckle pattern are captured on reference surfaces at a range of different distances from the illumination source. The image of the speckle pattern that is projected onto an object is then compared with the different reference images in order to identify the reference pattern that correlates most strongly with the speckle pattern on the object, and thus to estimate the location of the object within the range. Local cross-correlation between the speckle pattern on the object and the identified reference pattern may then be used to perform accurate 3D mapping of the object surface if desired.

There is therefore provided, in accordance with an embodiment of the present invention, a method for mapping, including:

projecting a primary speckle pattern from an illumination assembly into a target region;

capturing a plurality of reference images of the primary speckle pattern at different, respective distances from the illumination assembly in the target region;

capturing a test image of the primary speckle pattern that is projected onto a surface of an object in the target region;

comparing the test image to the reference images so as to identify a reference image in which the primary speckle pattern most closely matches the primary speckle pattern in the test image; and estimating a location of the object based on a distance of the identified reference image from the illumination assembly.

In a disclosed embodiment, the method includes finding respective offsets between the primary speckle pattern on multiple areas of the object in the test image and the primary speckle pattern in the identified reference image so as to derive a three-dimensional (3D) map of the object.

Typically, at least some of the different, respective distances are separated axially by more than an axial length of the primary speckle pattern at the respective distances.

In some embodiments, comparing the test image to the reference images includes computing a respective cross-correlation between the test image and each of at least some of the reference images, and selecting the reference image having the greatest respective cross-correlation with the test image.

In a disclosed embodiment, capturing the test image includes capturing a succession of test images while the object is moving, and estimating the location include tracking a movement of the object in the target region, wherein the object is a part of a human body, and wherein tracking the movement includes identifying a gesture made by the part of the human body and providing an input to a computer application responsively to the gesture.

There is also provided, in accordance with an embodiment of the present invention, apparatus for mapping, including:

an illumination assembly, which is configured to project a primary speckle pattern into a target region;

an imaging assembly, which is configured to capture a plurality of reference images of the primary speckle pattern at different, respective distances from the illumination assembly in the target region, and to capture a test image of the primary speckle pattern that is projected onto a surface of an object in the target region; and an image processor, which is coupled to compare the test image to the reference images so as to identify a reference image in which the primary speckle pattern most closely matches the primary speckle pattern in the test image, and to estimate a location of the object based on a distance of the identified reference image from the illumination assembly.

There is additionally provided, in accordance with an embodiment of the present invention, a computer software product, including a computer-readable medium in which program instructions are stored, which instructions, when read by a computer, cause the computer to receive a plurality of reference images of the primary speckle pattern that is projected into a target region by an illumination assembly, wherein the reference images are captured at different, respective distances from the illumination assembly in the target region, and to receive a test image of the primary speckle pattern that is projected onto a surface of an object in the target region, and to compare the test image to the reference images so as to identify a reference image in which the primary speckle pattern most closely matches the primary speckle pattern in the test image, and to estimate a location of the object based on a distance of the identified reference image from the illumination assembly.

The present invention will be more fully understood from the following detailed description of the embodiments thereof, taken together with the drawings in which:

DETAILED DESCRIPTION OF EMBODIMENTS

Figure 1:
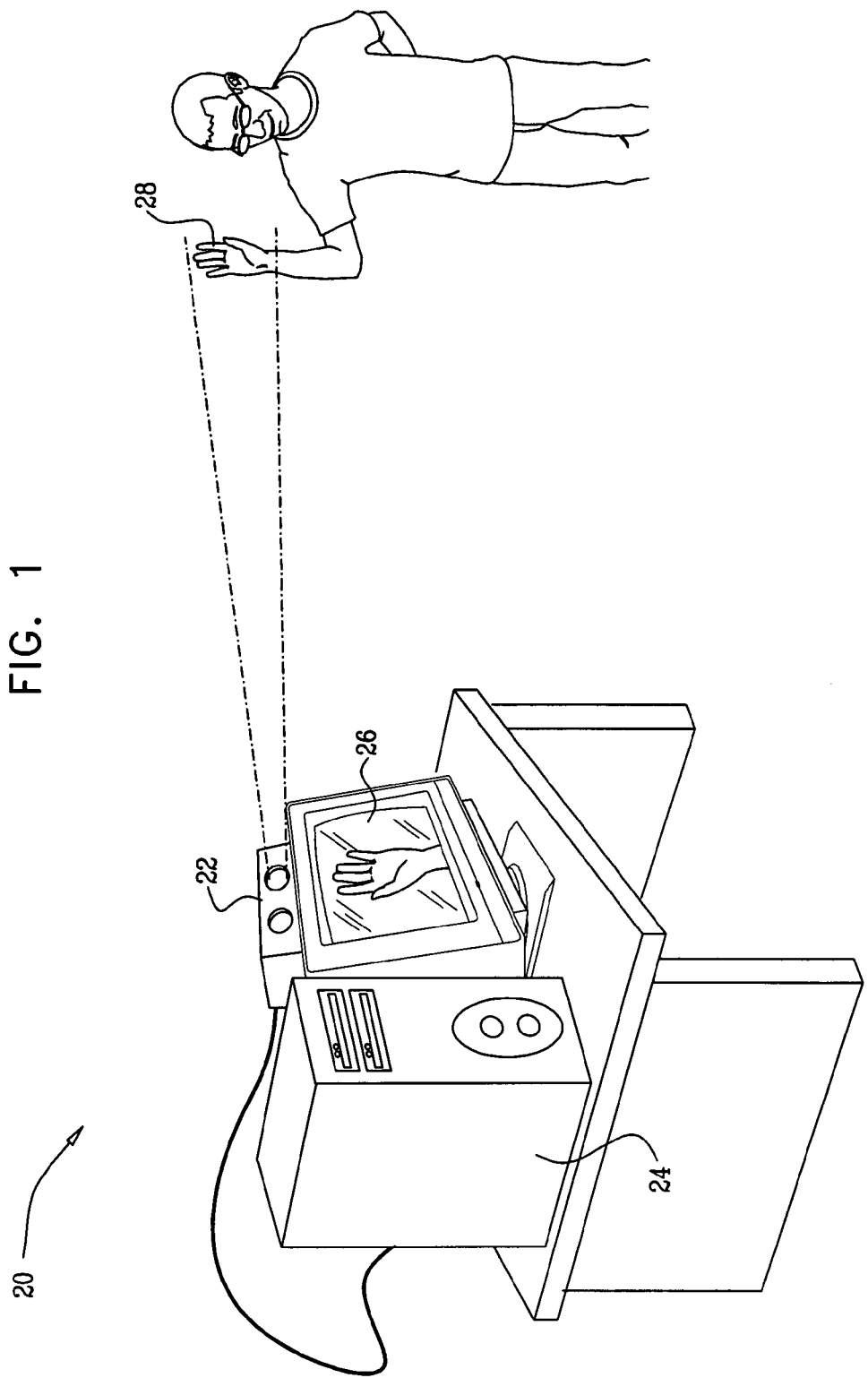
FIG. 1 is a schematic, pictorial illustration of a system for 3D ranging and mapping, in accordance with an embodiment of the present invention.

FIG. 1 is a schematic, pictorial illustration of a system 20 for 3D ranging and mapping, in accordance with an embodiment of the present invention. System 20 comprises a speckle imaging device 22, which generates and projects a primary speckle pattern onto an object 28 and captures an image of the primary speckle pattern appearing on the object. Details of the design and operation of device 22 are shown in the figures that follow and are described herein below with reference thereto. Other aspects of the theory and operation of system 20 are described in PCT Patent Application PCT/IL2006/000335, filed Mar. 14, 2006, which is assigned to the assignee of the present patent application and whose disclosure is incorporated herein by reference.

An image processor 24 processes image data generated by device 22 in order to determine the location of object 28 and to perform 3D ranging and mapping of the object. The term "3D ranging," as used in the present patent application and in the claims, refers to measuring or estimating the distance from a given coordinate origin to the location of an object in a 3D coordinate frame. The term "3D map" means a set of 3D coordinates representing the surface of an object. The derivation of such a map based on image data may also be referred to as "3D reconstruction."

Image processor 24, which determines the object location and performs such reconstruction, may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D information that is generated by processor 24 may be used for a wide range of different purposes. For example, the 3D map may be sent to an output device, such as a display 26, which shows a pseudo-3D image of the object. In the example shown in FIG. 1, object 28 comprises all or a part (such as a hand) of the body of a subject. In this case, system 20 may be used to provide a gesture-based user interface, in which user movements detected by means of device 22 control an interactive computer application, such as a game, in place of tactile interface elements such as a mouse, joystick or other accessory. Alternatively, system 20 may be used for ranging and mapping of objects of other types, for substantially any application in which 3D coordinate profiles are needed.

Figure 2:
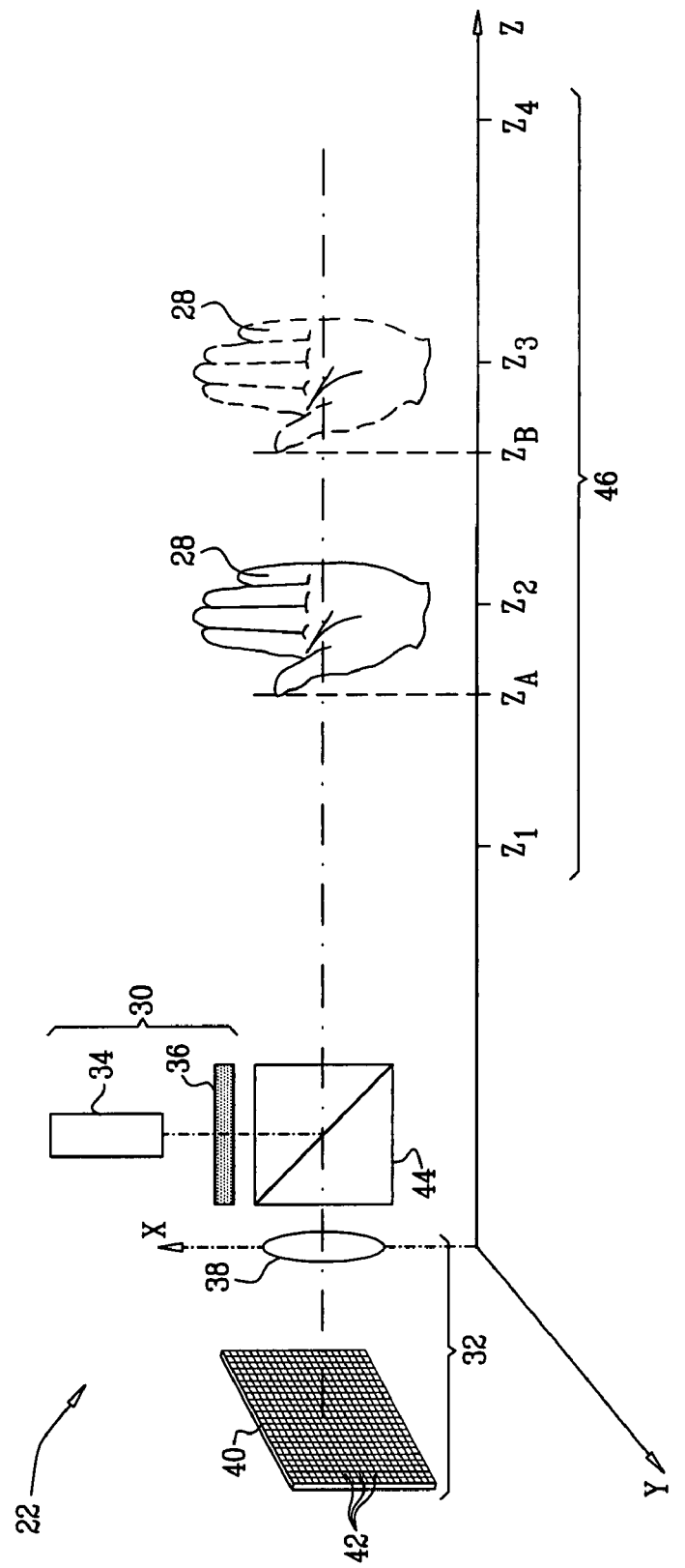
FIG. 2 is a schematic top view of a speckle imaging device, in accordance with an embodiment of the present invention.

FIG. 2 is a schematic top view of device 22, in accordance with an embodiment of the present invention. An illumination assembly 30 comprises a coherent light source 34, typically a laser, and a diffuser 36. (The term "light" in the context of the present patent application refers to any sort of optical radiation, including infrared and ultraviolet, as well as visible light.) The beam of light emitted by source 34 passes through the diffuser, reflects from a beamsplitter 44, and illuminates a target region 46 in which object 28 is located. An image capture assembly 32 captures an image of the speckle pattern that is projected onto object 28. Assembly 32 comprises objective optics 38, which focus the image onto an image sensor 40. Typically, sensor 40 comprises an array of detector elements 42, such as a CCD or CMOS-based image sensor array.

For simplicity and convenience of explanation, the optical axes of illumination assembly and image capture assembly 32 are shown in FIG. 2 as being collinear. This sort of arrangement is suitable for the sort of distance ranging based on speckle decorrelation that is described below. On the other hand, 3D reconstruction based on speckle cross-correlation generally uses triangulation, for which the imaging axis is typically displaced relative to the illumination axis. An arrangement of this sort is shown, for example, in the above-mentioned PCT Patent Application PCT/IL2006/000335. The principles of decorrelation-based ranging may similarly be applied in non-collinear systems of this sort.

In the description that follows, the Z-axis is assumed to be defined by the optical axis of image capture assembly 32. The origin is taken to be the entrance pupil of optics 38, or equivalently the surface of diffuser 36, as shown in FIG. 2. For object distances $Z_{obj}$ beyond the Rayleigh distance, the speckle pattern has an average axial length $$\Delta Z = \left(\frac{Z_{obj}}{w_0}\right)^2 \lambda,$$

wherein $\lambda$ is the wavelength and $w_0$ is the size of the spot formed on diffuser 36 by source 34. (It is assumed that the pupil diameter of optics 38 is much larger than $w_0$, so that secondary speckle due to image capture assembly 32 can be ignored.) For locations that are separated axially by less than $\Delta Z$, the primary speckle pattern as a function of angle relative to the Z-axis is substantially invariant with Z. In other words, the speckle patterns projected onto surfaces in region 46 that are displaced axially from one another by less than $\Delta Z$ will have a high cross-correlation (subject to transverse shift and scaling operations that might be necessary). To sense and process these speckle patterns, image capture assembly 32 should be capable of focusing over a depth of at least ΔZ.

On the other hand, over axial distances in region 46 that are greater than ΔZ, the angular shape of the speckles changes in random fashion. Therefore, the respective speckle patterns on surfaces that are separated axially by more than ΔZ will be uncorrelated. In other words, the speckle patterns at different distances from illumination assembly 30 are highly correlated at short ranges, below ΔZ, and decorrelate with increasing distance above ΔZ.

Figure 3:
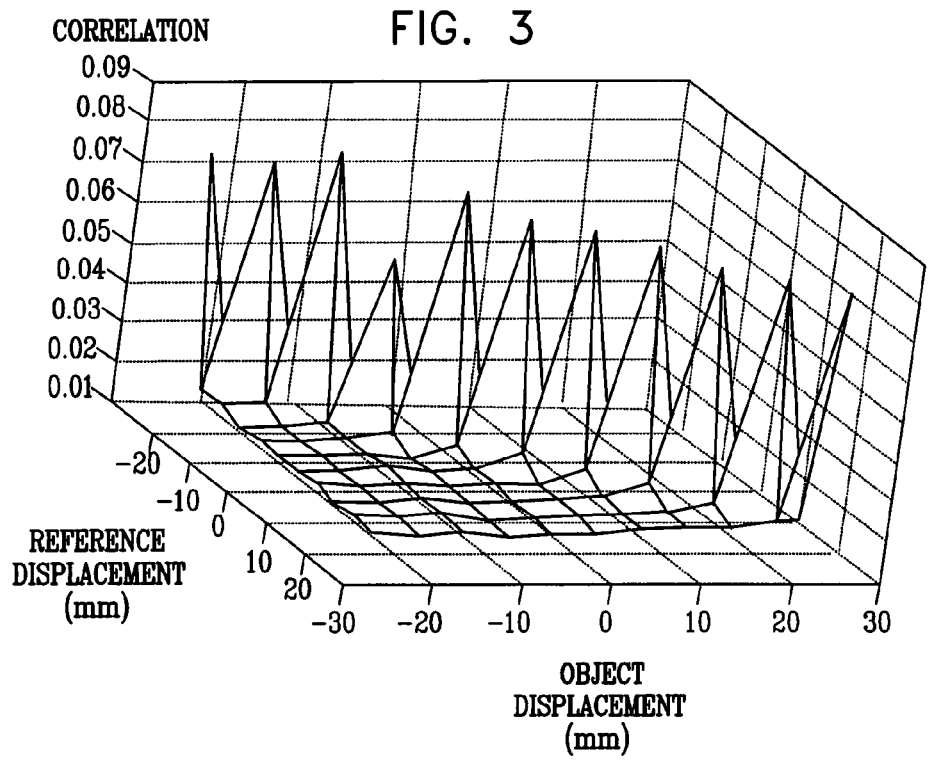
FIG. 3 is a plot that schematically shows cross-correlation between speckle patterns at different distances from an illumination assembly, in accordance with an embodiment of the present invention.

FIG. 3 is plot that schematically shows the cross-correlation between speckle patterns at different distances from illumination assembly 30, in accordance with an embodiment of the present invention. For the purpose of this plot, reference images of the projected speckle pattern are captured at a succession of planes at different, respective distances from the origin, such as at the fiducial locations marked $Z_1$, $Z_2$, $Z_3$, ..., in FIG. 2. (In the experiment on which FIG. 3 is based, in which ΔZ was intentionally set to a low value, the reference planes were spaced 5 mm apart.) Test images of the speckle pattern are then captured on an object (which may also be planar for the purposes of this experiment) at various distances from the origin, and the cross-correlation is computed between each test image and each of the reference images.

As shown in FIG. 3, high correlation between the speckle patterns in the test image and in the reference images were found only along the diagonal, i.e., for distances of the test plane and reference plane that were nearly equal. Off-diagonal test/reference image pairs gave very small values of cross-correlation. Thus, by computing the cross-correlations between a test image of an object at an unknown location in target region 46 and each of the reference images, it is possible to determine the distance range of the object from the illumination assembly. The resolution of this distance measurement is roughly equal to the speckle length ΔZ. The measurement error is given by $$\varepsilon = \frac{\Delta Z}{Z_{obj}} = \frac{Z_{obj}}{w_0^2} \lambda.$$

Returning to the example shown in FIG. 2, assuming ΔZ to be roughly equal to the distance between adjacent fiducial distances $Z_1$, $Z_2$, $Z_3$, ..., the speckle pattern on object 28 at location $Z_A$ will be correlated with the reference image of the speckle pattern captured at $Z_2$. On the other hand, the speckle pattern on the object at $Z_B$ will be correlated with the reference image at $Z_3$. These correlation measurements give the approximate distance of the object from the origin. Then, to map the object in three dimensions, processor 24 can use local cross-correlation with the reference image that gave the closest match.

Figure 4:
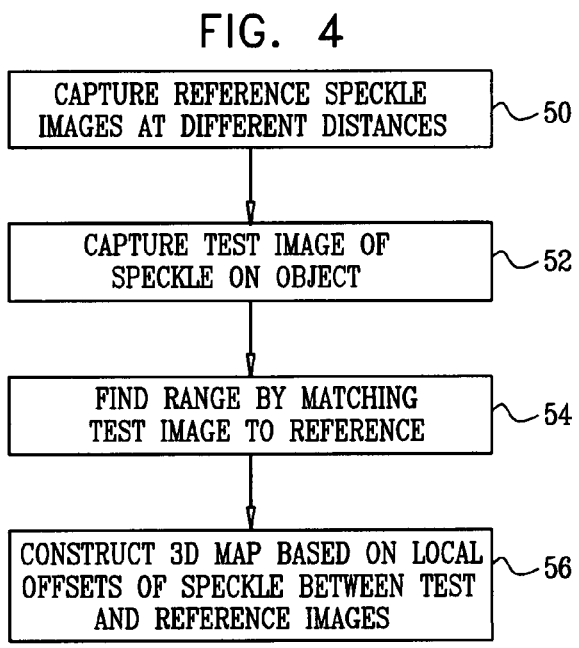
FIG. 4 is a flow chart that schematically illustrates a method for 3D ranging and mapping, in accordance with an embodiment of the present invention.

FIG. 4 is a flow chart that schematically illustrates a method for 3D ranging and mapping, in accordance with an embodiment of the present invention. The method is described hereinbelow, for the sake of clarity, with reference to system 20, as illustrated in FIGS. 1 and 2. This method may similarly be applied, however, in speckle-based imaging systems of other sorts, such as those described in the references cited above in the Background of the Invention or in the above-mentioned PCT Patent Application PCT/IL2006/000335.

In preparation for ranging and imaging of an object, imaging device 22 is operated to capture a sequence of reference speckle images, at a reference capture step 50. For this purpose, for example, a planar surface may be placed at a succession of different, known fiducial distances from the origin along the Z-axis, such as at $Z_1$, $Z_2$, $Z_3$, ..., and imaging assembly 32 captures corresponding images of the speckle pattern that is projected onto the surface by illumination assembly 30 at each distance. Typically, the spacing between the fiducial distances is less than or equal to the axial speckle length. Although $Z_1$, $Z_2$, $Z_3$, ..., are roughly equally spaced in FIG. 2, the spacing may alternatively increase with range.

Object 28 is introduced into target region 46, and device 22 captures a test image of the speckle pattern that is projected onto the surface of the object, at a test capture step 52. Processor 24 then computes the cross-correlation between the test image and each of the reference images, at a ranging step 54. In the coaxial configuration shown in FIG. 2, it may be possible to compute the cross-correlation without adjustment for relative shift or scaling of the speckle pattern in the test image relative to the reference images. On the other hand, in non-coaxial arrangements, such as that shown in the above-mentioned PCT patent application, it may be desirable to compute the cross-correlation for a number of different transverse (Y-direction) shifts of the test image relative to each reference image, and possibly for two or more different scaling factors. These adjustments depend on the specific configuration of the ranging and mapping system and will be apparent to those skilled in the art.

Processor 24 identifies the reference image that has the highest cross-correlation with the test image, and thus that the distance of object 28 from illumination assembly 30 in device 22 is approximately equal to the fiducial distance of this particular reference image. If only the approximate location of the object is needed, the method may terminate at this point.

Alternatively, processor 24 may reconstruct a 3D map of object 28, at a reconstruction step 56. For this purpose, the processor typically measures local offsets between the speckle pattern at different points on the object surface in the test image and corresponding areas of the speckle pattern in the reference image that was identified at step 54 as having the highest cross-correlation with the test image. The processor then uses triangulation, based on the offsets, to determine the Z-coordinates of these object points. Methods that may be used for these purposes are described in the above-mentioned PCT patent application and in the other references cited above. The combination of ranging at step 54 with 3D reconstruction at step 56, however, enables system 20 to perform accurate 3D reconstruction over a much larger range in the Z-direction than can generally be achieved by speckle-based triangulation alone.

Steps 52-56 may be repeated continually in order to track motion of object 28 within target region 46. For this purpose, device 22 captures a succession of test images captured while the object is moving, and processor 24 repeats step 54 and, optionally, step 56 in order to track the 3D movement of the object. It may be possible to compute the correlation at step 54 with respect to only some of the reference images, by assuming that the object has not moved too far since the previous iteration.

Although the embodiments described above use certain types of optical and imaging devices in certain specific configurations, the principles of the present invention may similarly be applied in other configurations in which primary speckle patterns are projected and imaged. For example, in another embodiment of the present invention (not shown in the figures), the thickness of a transparent object is measured by imaging the speckle pattern transmitted through the object, rather than the speckle pattern reflected from the object surface as in the configuration of FIG. 2.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for mapping, comprising:
   projecting a primary speckle pattern from an illumination assembly into a target region;
   capturing a plurality of reference images of the primary speckle pattern at different, respective distances from the illumination assembly in the target region;
   capturing a test image of the primary speckle pattern that is projected onto a surface of an object in the target region;
   comparing the test image to the reference images so as to identify a reference image in which the primary speckle pattern most closely matches the primary speckle pattern in the test image; and
   estimating a location of the object based on a distance of the identified reference image from the illumination assembly.

2. The method according to claim 1, and comprising finding respective offsets between the primary speckle pattern on multiple areas of the object in the test image and the primary speckle pattern in the identified reference image so as to derive a three-dimensional (3D) map of the object.

3. The method according to claim 1, wherein at least some of the different, respective distances are separated axially by more than an axial length of the primary speckle pattern at the respective distances.

4. The method according to claim 1, wherein comparing the test image to the reference images comprises computing a respective cross-correlation between the test image and each of at least some of the reference images, and selecting the reference image having the greatest respective cross-correlation with the test image.

5. The method according to claim 1, wherein capturing the test image comprises capturing a succession of test images while the object is moving, and wherein estimating the location comprise tracking a movement of the object in the target region.

6. The method according to claim 5, wherein the object is a part of a human body, and wherein tracking the movement comprises identifying a gesture made by the part of the human body and providing an input to a computer application responsively to the gesture.

7. Apparatus for mapping, comprising:
   an illumination assembly, which is configured to project a primary speckle pattern into a target region;
   an imaging assembly, which is configured to capture a plurality of reference images of the primary speckle pattern at different, respective distances from the illumination assembly in the target region, and to capture a test image of the primary speckle pattern that is projected onto a surface of an object in the target region; and
   an image processor, which is coupled to compare the test image to the reference images so as to identify a reference image in which the primary speckle pattern most closely matches the primary speckle pattern in the test image, and to estimate a location of the object based on a distance of the identified reference image from the illumination assembly.

8. The apparatus according to claim 7, wherein the image processor is arranged to find respective offsets between the primary speckle pattern on multiple areas of the object in the test image and the primary speckle pattern in the identified reference image so as to derive a three-dimensional (3D) map of the object.

9. The apparatus according to claim 7, wherein at least some of the different, respective distances are separated axially by more than an axial length of the primary speckle pattern at the respective distances.

10. The apparatus according to claim 7, wherein the image processor is arranged to compute a respective cross-correlation between the test image and each of at least some of the reference images, and to select the reference image having the greatest respective cross-correlation with the test image.

11. The apparatus according to claim 7, wherein the imaging assembly is configured to capture a succession of test images while the object is moving, and wherein the image processor is arranged to process the test images so as to track a movement of the object in the target region.

12. The apparatus according to claim 11, wherein the object is a part of a human body, and wherein the image processor is arranged to identify a gesture made by the part of the human body and to provide an input to a computer application responsively to the gesture.

13. A computer software product, comprising a computer-readable medium in which program instructions are stored, which instructions, when read by a computer, cause the computer to receive a plurality of reference images of the primary speckle pattern that is projected into a target region by an illumination assembly, wherein the reference images are captured at different, respective distances from the illumination assembly in the target region, and to receive a test image of the primary speckle pattern that is projected onto a surface of an object in the target region, and to compare the test image to the reference images so as to identify a reference image in which the primary speckle pattern most closely matches the primary speckle pattern in the test image, and to estimate a location of the object based on a distance of the identified reference image from the illumination assembly.

14. The product according to claim 13, wherein the instructions cause the computer to find respective offsets between the primary speckle pattern on multiple areas of the object in the test image and the primary speckle pattern in the identified reference image so as to derive a three-dimensional (3D) map of the object.

* * * * *